J. H. BONDY.
PNEUMATIC COUNTERSINKING MACHINE.
APPLICATION FILED JUNE 27, 1912.
1,059,428.
Patented Apr. 22, 1913.
2 SHEETS—SHEET 1.
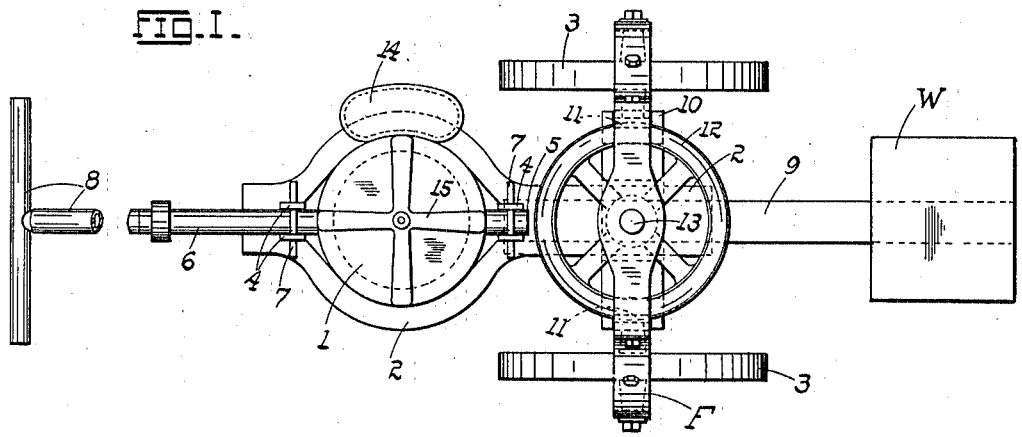
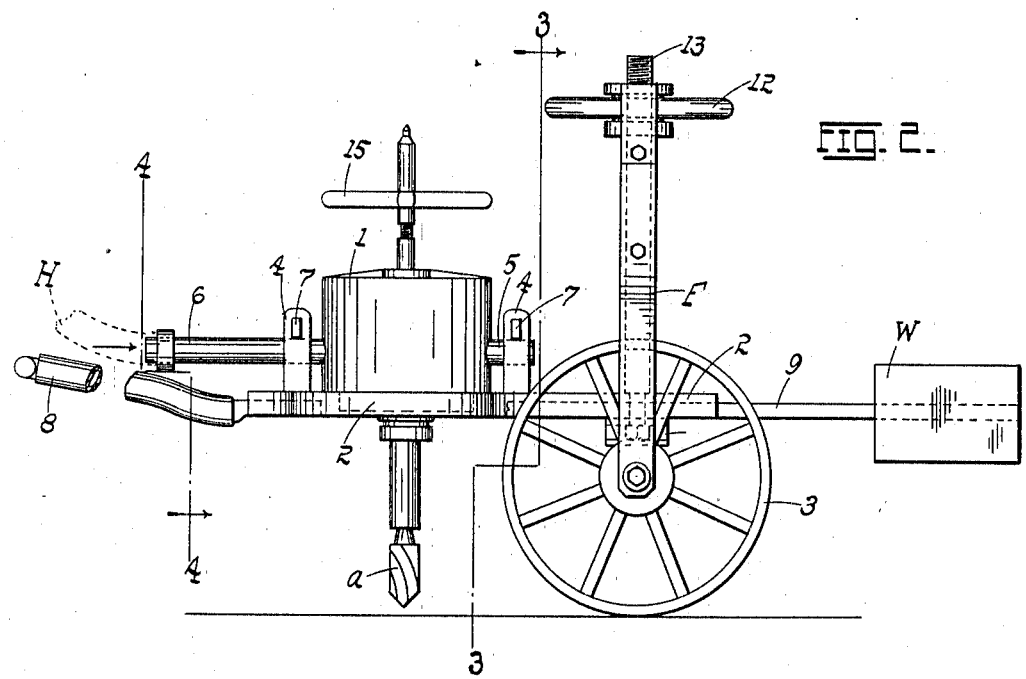
WITNESSES:
INVENTOR.
James H. Bondy
BY
ATTORNEY.

J. H. BONDY.
PNEUMATIC COUNTERSINKING MACHINE.
APPLICATION FILED JUNE 27, 1912.

1,059,428.

Patented Apr. 22, 1913.
2 SHEETS—SHEET 2.

WITNESSES:
Harry U. Beimes
Jos. A. Michel

INVENTOR.
James H. Bondy.
BY Emil Stover
ATTORNEY.

UNITED STATES PATENT OFFICE.

JAMES H. BONDY, OF GREAT FALLS, MONTANA, ASSIGNOR OF ONE-HALF TO ARCHER E. WHEELER, OF GREAT FALLS, MONTANA.

PNEUMATIC COUNTERSINKING-MACHINE.

1,059,428. Specification of Letters Patent. Patented Apr. 22, 1913.

Application filed June 27, 1912. Serial No. 706,221.

*To all whom it may concern:*

Be it known that I, JAMES H. BONDY, a citizen of the United States, residing at Great Falls, in the county of Cascade and State of Montana, have invented certain new and useful Improvements in Pneumatic Countersinking-Machines, of which the following is a full, clear, and exact description, reference being had to the accompanying drawings, forming a part hereof.

My invention has relation to improvements in pneumatic countersinking machines; and it consists in the novel details of construction more fully set forth in the specification and pointed out in the claims.

Figure 3:
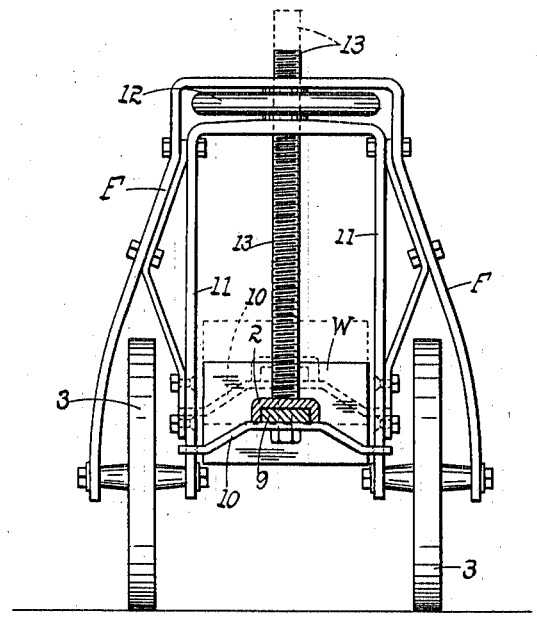
Figure 4:
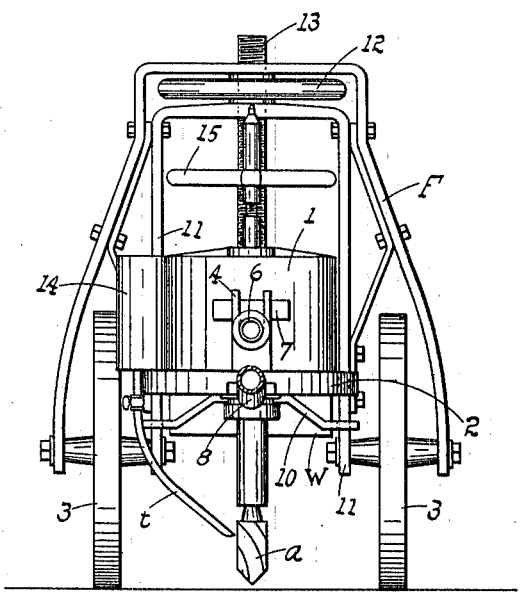

In the drawings, Figure 1 is a top plan of the machine; Fig. 2 is a side elevation thereof; Fig. 3 is a vertical cross-section on the line 3—3 of Fig. 2; and Fig. 4 is an end elevation, with a cross-section on the line 4—4 of Fig. 2.

The object of my invention is to provide a machine of the character referred to which may be moved to and from the structural member operated on, in lieu of the prevailing practice of moving the articles to be drilled, to the machine. In the case of rails, boiler plates, I-beams, T's, angle-bars, and other heavy structural members, it is inexpedient to move these heavy and clumsy articles to the drilling machine, and where the machine is moved to the articles operated on, it generally assumes the form of some small but inconvenient hand-tool. In plants where heavy structural members are moved to the drilling machine, much time and labor is necessarily consumed, requiring considerable apparatus and a large number of helpers to accomplish the purpose.

The object here sought is to improvise a portable tool which will minimize the labor and time of drilling and hence reduce the cost of production.

In detail, the invention may be described as follows:—

Referring to the drawings, 1 represents a conventional form of pneumatic drill understood in the art and not claimed herein, the same being mounted on a portable truck-frame 2 provided with running wheels 3. The forward portion of the frame 2 is provided with the pairs of fork members or lugs 4, 4, which receive between them the boss 5, and the air delivery pipe 6, this arrangement securing the drill in place and preventing the same from turning when in use.

H, represents a hose coupled to the pipe 6 and leading to any suitable source of compressed-air supply (not shown).

A pin 7 is passed through the members 4, 4, above the parts 5 and 6, to prevent upward displacement of the drill. To one end of the frame 2, preferably the front, is attached a handle 8 preferably of piping for properly handling the truck and moving the same about from place to place. The handle, forming as it does a rigid extension of the truck-frame, may be used as a lever against which the operator may bear his weight and thereby firmly hold the bit $a$ of the drill against the stock material operated on. Forming a rear extension of the truck-frame is a bar 9 on which is adjustably mounted a counter-weight W, said weight not only imparting increased weight to the machine which resists the thrust of the drill, but serving to balance the truck so that the latter may more conveniently be handled.

The parts aforesaid (with the exception of the wheels 3, 3), are carried by the vertically adjustable transverse truss-shaped member or slide 10, the ends of the latter being mounted slidingly on the sides of the inverted U-shaped member 11 forming the inner section of the guide-frame F which spans the truck-frame and directly supports the running wheels 3. The slide 10 is adjusted by the hand-wheel 12 mounted between the upper transverse horizontal portions of the inner and outer sections of the guide-frame, said wheel operating as a nut on a screw-stem 13 rigidly secured at its lower end to the frame 2 and slide 10, the upper end of the screw-stem passing freely through the top of the guide-frame F. Rotation of the hand-wheel in proper direction raises or lowers the screw and hence elevates or lowers the truck-frame 2 to bring the bit $a$ of the drill thereof to any desired elevation according to the height of the stock or structural member or plate being operated on. The frame 2 being thus once brought to any desired elevation will remain in its position until shifted therefrom by the manipulation of the hand-wheel 12. The slide 10 is mounted above the axis of oscillation of the frame F, thus bringing the center of gravity of the parts carried by the truck in close proximity to the axis of the running wheels, or the axis of oscillation of the frame F.

Attached to any convenient portion of the frame 2 adjacent the drill is a box 14 for holding soap-water, oil or other liquid which by suitable piping $t$ is conducted to the body of the bit $a$ to keep the latter cool while in service.

The machine though specifically designed for countersinking, may be used for drilling, boring, or reaming, depending of course on the character of bit employed with the drill. The drill is provided with any suitable hand wheel 15 not here claimed and here shown conventionally. The design of truck or carriage here shown need not of course, be adhered to, any equivalent thereof falling within the spirit of my invention. In effect, both the frames F and 2 constitute a truck-frame because they jointly may be considered as forming a truck mounted on the wheels 3, 3. For convenience however, the horizontal frame 2 is here designated as the truck-frame, the frame F being the guide-frame. They both however, tilt in a vertical plane about the rotation axis of the wheels 3, 3. The feed of the drill is accomplished not only by the weight of the machine, but by the weight of the operator on the handle 8 if necessary. The invention is obviously not limited to "pneumatic" machines.

Having described my invention, what I claim is:—

1. In combination with a balanced, vertically-tilting frame, a vertically sliding member mounted thereon above the axis of oscillation of the frame, and a drill coöperatively connected to said sliding member and adapted to be elevated to any position depending on the height of the stock operated on.

2. In combination with a balanced, vertically-tilting guide-frame, a vertically sliding truck-frame mounted thereon above the axis of oscillation of the guide-frame, and a tool on the truck-frame removed a suitable distance from the guide-frame.

3. In combination with a balanced, vertically-tilting guide-frame, a vertically sliding truck-frame mounted thereon above the axis of oscillation of the guide-frame and extending in opposite directions therefrom, a tool on the truck-frame on one side of the guide-frame, and a counter-weight on the truck-frame on the opposite side of the guide-frame.

4. In combination with a portable vertically-tilting and balanced guide-frame, a truck-frame mounted slidingly thereon above the axis of oscillation of the guide-frame, a tool on the truck-frame removed from the guide-frame, and a counterweight for balancing the tool.

5. In combination with a vertically-tilting, balanced guide-frame, a vertically sliding member mounted on said guide-frame above the axis of oscillation of the frame, a truck-frame coupled to the sliding member and oscillatable vertically about a fixed axis, and a tool carried by the truck-frame.

6. In combination with a portable frame, a slide movable vertically along and guided by said frame, a screw-stem leading from said slide and passing loosely through the top of the frame, a hand-wheel for actuating the screw-stem and thereby adjusting the slide, a truck-frame secured to the slide, a drill on said truck frame, and means on the truck frame for holding the drill-tool against the stock operated on.

7. In combination with a pair of running wheels, a vertical guide-frame leading from the common axis of rotation of the wheels, and spanning the wheels, a slide movable and adjustable vertically on said frame, a vertically tilting truck-frame secured to said slide and mounted between the sides of the guide-frame, a drill mounted on the truck-frame on one side of the rotation axis of the wheels, a handle-bar extension for the truck-frame rigidly connected to the latter on the side supporting the drill, and means on the truck-frame on the opposite side of the rotation axis of the wheels for balancing the truck-frame, the parts operating substantially as, and for the purpose set forth.

8. In combination with a portable guide-frame adapted to oscillate vertically about a fixed axis, a slide on said guide-frame, means on the guide-frame for adjusting the position of the slide, a member leading from the slide a suitable distance from the guide-frame and free to oscillate with the guide-frame, and a tool supported from said member.

In testimony whereof I affix my signature, in presence of two witnesses.

JAMES H. BONDY.

Witnesses:
TIMOTHY P. CORCORAN,
WILLIAM H. BEARD.

Copies of this patent may be obtained for five cents each, by addressing the "Commissioner of Patents, Washington, D. C."